United States Patent [19]

Lehtimäki

[11] Patent Number: 5,641,266
[45] Date of Patent: Jun. 24, 1997

[54] METHOD FOR FEEDING A SHEET SUBSTACK FROM A SHEET STACK AND APPARATUS FOR IMPLEMENTING SAID METHOD

[75] Inventor: Teuvo Junhani Lehtimäki, Lahti, Finland

[73] Assignee: Sunds Defibrator Panelhandling Oy, Nastola, Finland

[21] Appl. No.: 428,244

[22] PCT Filed: Nov. 19, 1993

[86] PCT No.: PCT/FI93/00492

§ 371 Date: May 2, 1995

§ 102(e) Date: May 2, 1995

[87] PCT Pub. No.: WO94/11285

PCT Pub. Date: May 26, 1994

[30] Foreign Application Priority Data

Nov. 19, 1992 [FI] Finland .................................... 925272

[51] Int. Cl.⁶ ........................................................ B65H 3/24
[52] U.S. Cl. .................... 414/796; 414/796.6; 414/796.7; 414/796.8
[58] Field of Search ..................... 414/796, 796.5, 414/796.7, 796.8, 796.9

[56] References Cited

U.S. PATENT DOCUMENTS

| | | | |
|---|---|---|---|
| 3,744,649 | 7/1973 | Ward, Jr. .................................... | 414/796 |
| 3,844,426 | 10/1974 | Campbell .................................... | 414/796 |
| 3,908,836 | 9/1975 | Ikeda . | |
| 4,726,724 | 2/1988 | Jenkner .................................... | 414/796.5 |
| 4,988,265 | 1/1991 | Schwab et al. .................................... | 414/796 |
| 5,018,940 | 5/1991 | Hognestad et al. .................................... | 414/796.8 |
| 5,205,705 | 4/1993 | Jenkner .................................... | 414/796.8 |
| 5,443,356 | 8/1995 | Naldi .................................... | 414/796.8 |

FOREIGN PATENT DOCUMENTS

| | | |
|---|---|---|
| 0381649 | 8/1990 | European Pat. Off. . |
| 0436796 | 7/1991 | European Pat. Off. . |
| 0552743 | 7/1993 | European Pat. Off. . |
| 2433128 | 1/1976 | Germany . |
| 0456907 | 11/1988 | Sweden . |

*Primary Examiner*—Karen B. Merritt
*Assistant Examiner*—Gregory A. Morse
*Attorney, Agent, or Firm*—Birch, Stewart, Kolasch & Birch, LLP

[57] ABSTRACT

A method and apparatus for feeding a sheet substack formed by one or a greater number of stacked sheets from a sheet stack (8), in particular feeding the sheets into a cutting saw from a feed station (1) or similar unit, the feed station comprising a pusher (11) for transferring the sheet substack from atop a sheet stack (8) and a back gauge (12) or similar element, in which station at least one of the following, either the back gauge (12) or the sheet stack (8), or even both, is/are movable relative to each other in the vertical direction, in which method the sheet stack (8) or the back gauge (12), or both, is/are moved relative to each other in the vertical direction and the pusher (11) is employed for pushing the sheet substack remaining above the upper edge of the back gage (12) to further processing. The feed movement of the pusher (11) is started before the leading edge of the sheet substack formed by one or a greater number of sheets is entirely elevated above the upper edge of the back gauge (12), after which the back gauge (12), or alternatively the sheet stack (8), or even both, is/are moved relative to each other in the vertical direction, until the sheet substack being fed is entirely above the upper edge of the back gauge (12) and the sheet substack of one or a greater number of sheets thus separable from the sheet stack (8) is pushed by the pusher (11) to further processing.

6 Claims, 5 Drawing Sheets

METHOD FOR FEEDING A SHEET SUBSTACK FROM A SHEET STACK AND APPARATUS FOR IMPLEMENTING SAID METHOD

The invention relates to a method for feeding a part of a stack, or a substack, formed by one or multiple sheets from the sheet stack. The invention also concerns an apparatus implementing the method according to present invention.

BACKGROUND OF THE INVENTION

Sheets are conventionally fed to a cut saw individually, after which the cut sheets are stacked on a stacking table into a stack for subsequent trimming sawing. The trimming sawing is performed in substacks of multiple stacked sheets. When sawing thin sheets, the feed system of sheets to a sawing line has generally been a limiting factor for the capacity of the sawing line.

To overcome the sheet feed problem from forming a capacity limiting factor, methods have been developed for feeding multiple sheets simultaneously, even a full stack at a time from the sheet stack to the sawing line. However, such methods are generally applicable to thick sheets only.

SUMMARY OF THE INVENTION

It is an object of the present invention to achieve a method in which even thin sheets can be fed reliably as substacks to the cutting saw. The characterizing properties of the method and apparatus according to the invention are disclosed in the annexed claims.

The method according to the invention offers several benefits over conventional techniques. The implementation according to the present method makes it possible to feed multiple thin sheets in a substack to the cutting saw. Longitudinal deviations from parallelity of edges or defects on the leading edge of the sheet substack do not hamper the feed method according to the invention. Only a single measurement sensor location is required for the measurement of the sheet substack being fed.

BRIEF DESCRIPTION OF DRAWINGS

In the following the invention is examined by way of an exemplifying embodiment with reference to the annexed drawings in which.

DETAILED DESCRIPTION OF THE INVENTION

Figure 1:
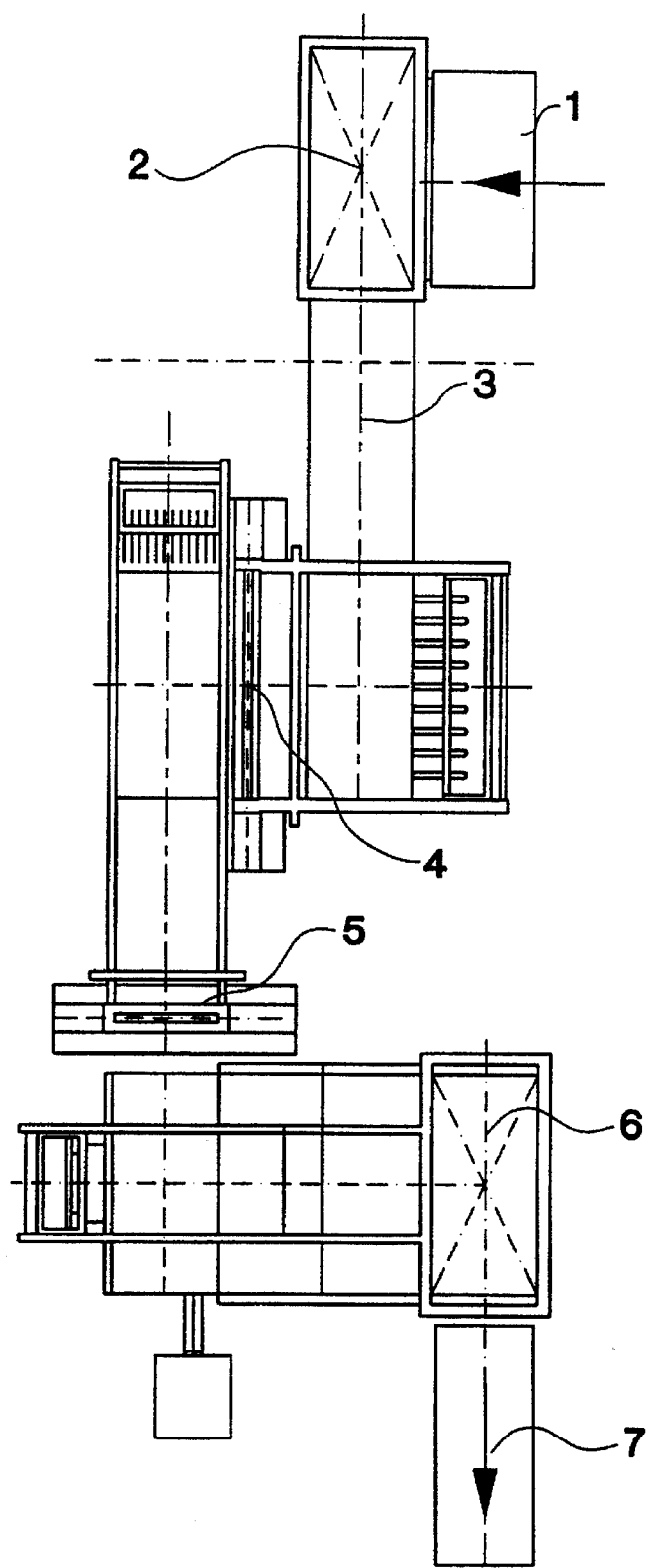
FIG. 1 shows a top view of a sawing line layout for a cutting saw.

With reference to FIG. 1, a cutting saw line is shown. During the operation of the line, a sheet substack is transferred by means of a feed conveyor 1 to a feed station 2, wherefrom the sheets are fed either individually or in substacks via a stacking table 3 to cutting saw sections 4, 5. Subsequent to sawing, the sheets are transferred to a stacking station 6 and further to an outfeed conveyor 7.

Figure 2:
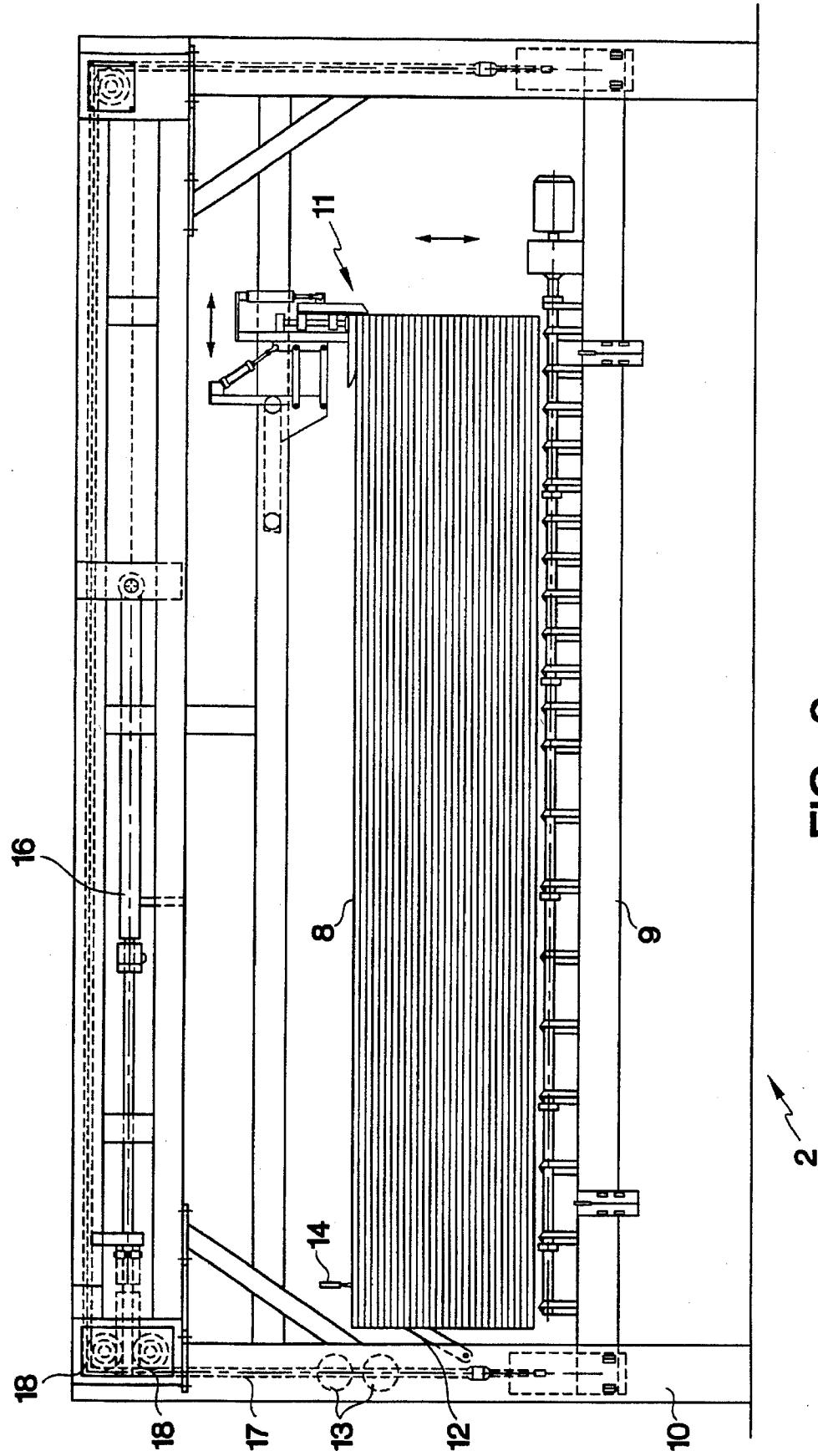
FIG. 2 shows a side view of a feed apparatus operating by virtue of the method according to the invention.
Figure 3:
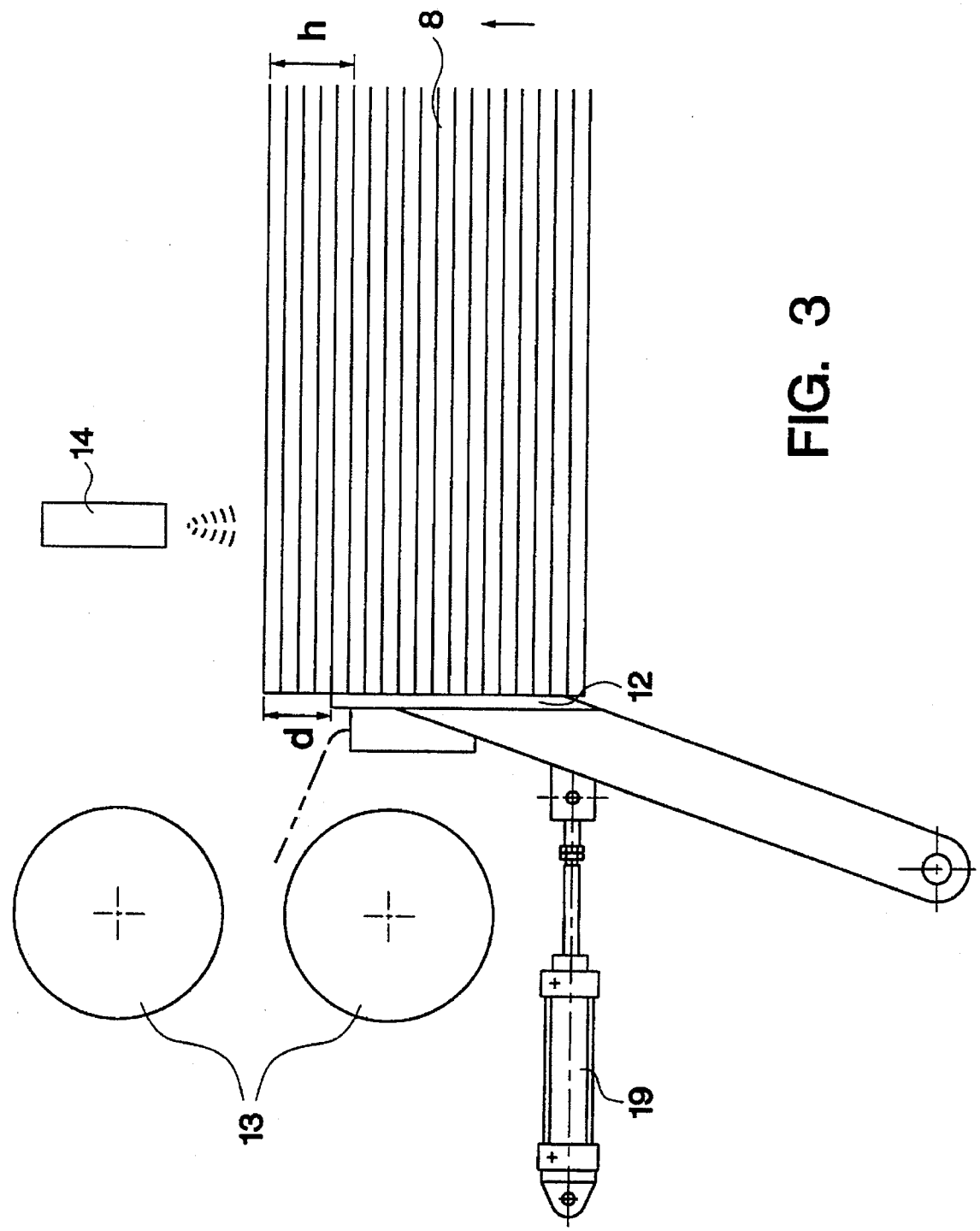
FIG. 3 shows a simplified diagram of the back gauge and the sheet stack end at the back gauge side.
Figure 4:
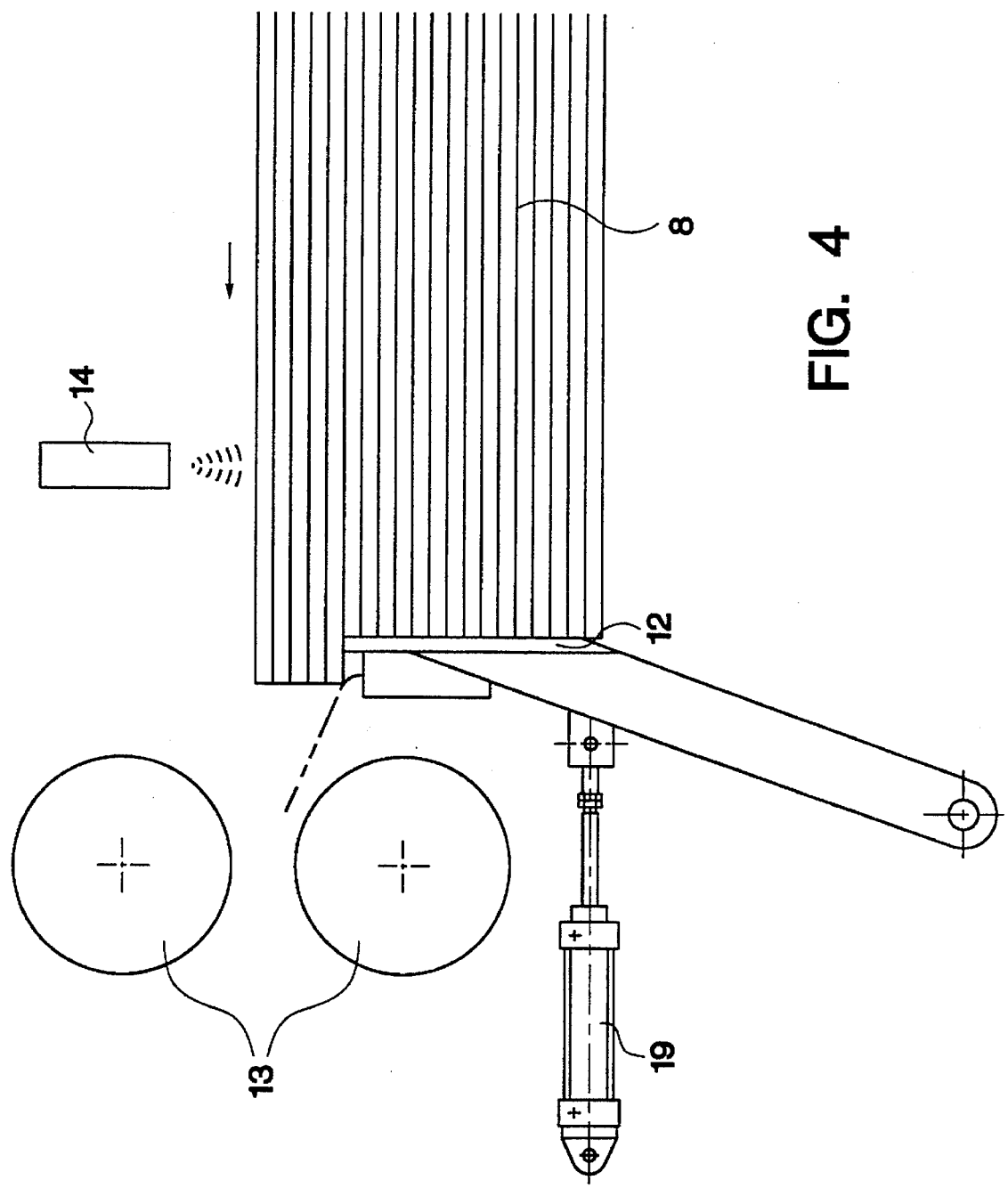
FIG. 4 shows another simplified diagram of the back gauge and the sheet stack end at the back gauge side.
Figure 5:
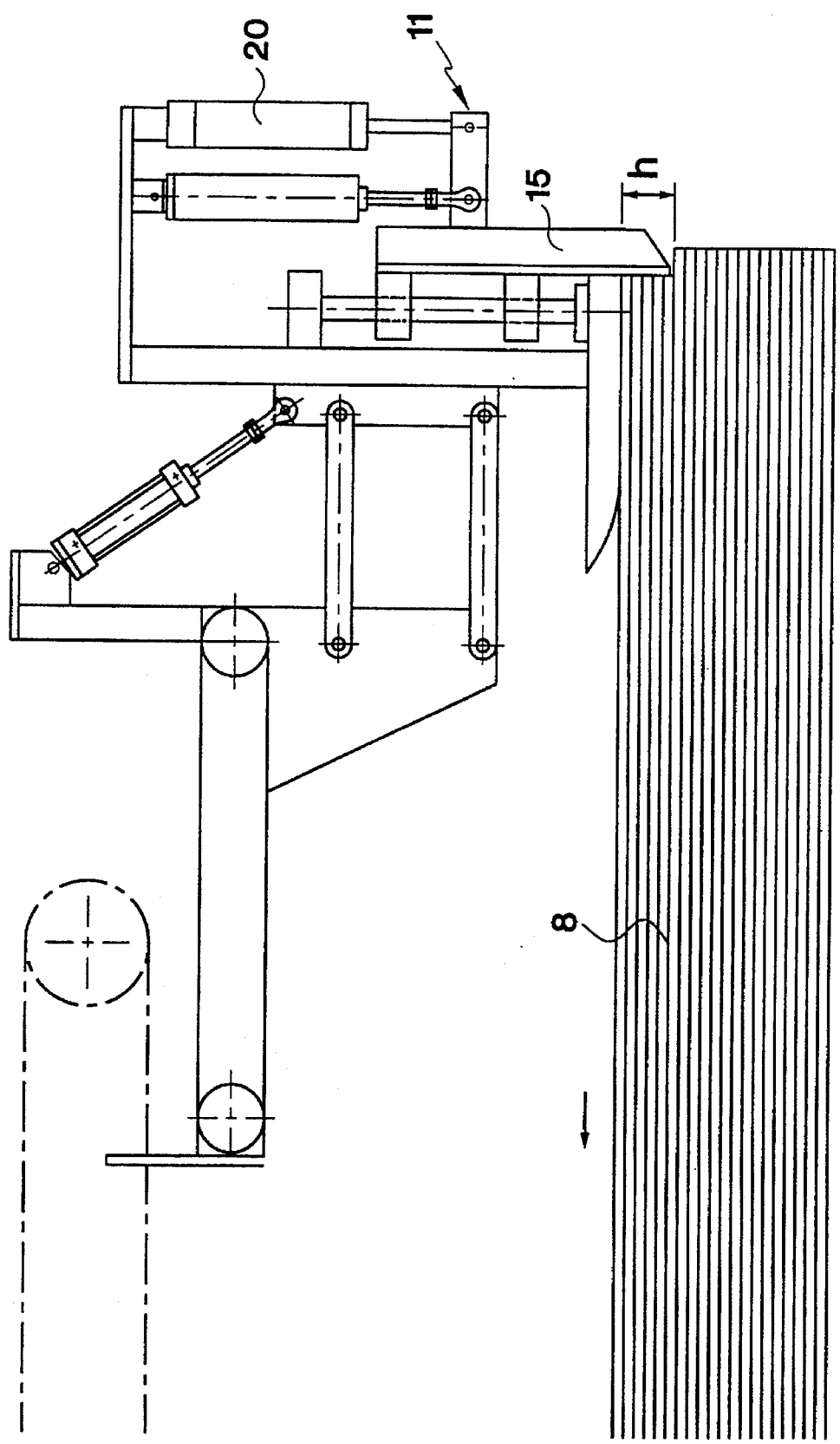
FIG. 5 shows a simplified diagram of a pusher of the feed station.

With reference to FIG. 2 the feed station 2 is illustrated having a sheet stack 8 piled onto a lift table 9 or equivalent apparatus. The lift table 9 is adapted to be vertically movable along a frame 10 of the feed station. The lift table upward/downward movement is implemented by means of lift machinery. The lift machinery comprises chains 17 attached at their one ends to the lift table 9, and passing over chain sprockets 18, at their other ends to an lift machinery 16, whose movement is controlled to implement the upward/downward movement of the lift table 9. The lifting movement can be implemented by means of a different arrangement such as a scissor-lift platform. The feed station is provided with a pusher carriage 11 which is movable on horizontal rails by means of a mechanical, hydraulic or pneumatic actuator machinery. A back gauge 12 is arranged to the opposite end of the sheet stack relative to the pusher 11. The pushing force delivered by the pusher 11 is controllable. Advantageously, the force control function is implemented by means of a pressure-limiting valve in a pneumatic and hydraulic system, while a motor torque limiter is employed in a mechanical system.

The pusher 11 pushes a desired number of sheets from the sheet stack 8 over the back gauge 12 into the nip between pinch rollers 13, whereby the nip further feeds the sheets onto the stacking table 3.

The sheet substack containing a desired number of sheets is measured with the help of a measurement element, which is adapted to a feed clamp assembly 15 of the pusher 11 abutting the end of the sheet substack. Such a feed clamp assembly is advantageously adapted vertically movable by pneumatic means and thus capable of being lowered onto the sheet substack 8 for the duration of the feed motion and lifted upward for the duration of the return motion. The control of the feed clamp assembly 15 can be advantageously implemented by hydraulic or electrical means. The electrical feedback signal from the position of the feed clamp assembly 15 is arranged by means of, e.g., a pulse transducer (not shown in the diagram).

The back gauge 12 is transferrable against the leading edge of the substack 8 with the help of an actuator 19. The actuator 19 is advantageously an electrically or pneumatically driven element, advantageously a hydraulic cylinder.

The position of the substack upper surface is implemented by means of a sensor 14 such as an electrical displacement sensor or mechanical sensor, whose position is monitored with the help of a pulse transducer.

Preferably, the pinch roller 13 for feeding the sheet substack further to the subsequent stages is adapted to the frame 10. The pinch rollers assembly is advantageously implemented by means of electrically driven driver rollers and pneumatically actuated pinch rollers with which the sheet substack is pressed against the driver rollers.

In the method according to the invention the sheet substack is fed from a stack resting in the feed station by virtue of the following sequence:

The height h of the sheet substack to be fed is predetermined on the basis of the desired total height of the sheet substack by, e.g., summing up the thicknesses of the individual sheets.

On the basis of the sheet substack desired height h, the pusher feed clamp assembly 15 is controlled to a position almost extending over the height h, advantageously by 0.5–2 mm less than the dimension h.

Initially, the sheet substack 8 is fed to the feed table 9 of the feed station. The sheet substack is elevated on the lift table until the substack feed height measurement sensor 14 senses the stack upper surface to surmount the feed level (upper edge of the back gauge 12) by a dimension d. The dimension d is advantageously smaller by 2–6 mm than the desired height (dimension h) of the sheet substack to be fed. The back gauge 12 is controlled in the feed direction against the leading edge of the sheet substack 8. The pusher 11 is controlled against the trailing edge of the sheet substack and the pusher is controlled to push the sheet substack to be fed with a limited force in the feed direction. However, as the lowermost sheet of the substack is not yet entirely above the back gauge 12, the back gauge 12 stops the feed motion. While the pusher is still being controlled to push the sheet substack with a limited force, the sheet substack 8 is slowly elevated, whereby at the instant the lowermost sheet of the sheet substack being fed is above the upper edge of the back gauge 12, the sheet substack being fed is freed and pushed forward by the pusher. The lift movement of the sheet substack 8 is controlled to stop at the instant the sheet substack is detected with the help of, e.g., a sensor adapted to the pusher 1i or the back gauge 12, to move forward.

The pusher 11 introduces the sheet substack into the nip between the pinch rollers 13 after which the nip feeds the substack forward.

Next, the pusher 11 returns to its home position. For the feed of the next substack, the sheet stack is again elevated so that the upper surface of the substack reaches by the dimension d above the upper edge of the back gauge 12.

The method according to the invention is particularly characterized in that the measurement of the height (dimension h) of the sheet substack being fed is performed with the help of the feed clamp from the trailing edge of the sheet substack only. The height measurement (dimension d) from the leading edge of the sheet stack is required for a coarse positioning of the stack upper surface alone.

The method according to the invention is particularly suited for thin sheets. The sheet thickness can vary in the range 1–9 mm, advantageously in the range 2–6 mm. In an embodiment the height of the sheet substacks being fed was varied in the range 15–30 mm. The size of the sheets in the sheet stack is not limited; in an embodiment the sheets were 2500×5000 mm in size with a thickness of 3 mm. In the embodiment the number of sheets in the sheet substack being fed was controllable from 5 to 10.

For those versed in the art it is obvious that the invention is not limited to the exemplifying embodiments described above, but rather, can be varied within the scope of the annexed claims. Thus, the back gauge rather than the sheet stack can be alternatively adapted to be movable. Moreover, both the back gauge and the sheet stack can be movable relative to each other.

I claim:

1. A method for feeding a sheet substack formed by at least one stacked sheet from a sheet stack from a feeding station to a processing station, comprising the steps:

providing sheets to a feeding station, said feed station including a back gauge, said back gauge having an upper edge, and a pusher for transferring the sheet substack from atop the sheet stack, the sheet stack and said back gauge being moveable relative to one another in the vertical direction, the pusher including a controller means for controlling the pressing force of the pusher against the sheet substack between at least a first force and a second force, the first force being less than the second force;

moving the sheet stack upward in the vertical direction relative to the back gauge; and pushing the sheet substack disposed above the upper edge of the back gauge by the pusher to the processing station; wherein said pushing by the pusher is with the first force before the leading edge of the sheet substack is entirely moved above the upper edge of the back gauge, and said moving of the sheet stack continues until a leading edge of a lowermost sheet of the sheet substack is above the upper edge of the back gauge and the sheet substack begins separation from the sheet stack by said pushing of the pusher with the second force.

2. The method as defined in claim 1, wherein said moving of the sheet stack relative to the back gauge, after the start of said pushing, is at a slower speed than prior to the start of said pushing.

3. The method as defined in claim 2 or 1, further comprising measuring the height (h) of the sheet substack being fed by a measurement element.

4. The method as defined in claim 3, wherein said measuring includes determining the height (h) of the sheet substack from the number of sheets desired to be included in the sheet substack.

5. The method as defined in claim 3, wherein the sheets are thin sheets with a thickness in a range from 1 mm to 9 mm.

6. An apparatus for feeding a sheet substack formed from at least one stacked sheet of a sheet stack from a feed station to a processing station, comprising a lift table on which the sheet substack being fed is placed, a pusher for feeding the sheet substack from the sheet stack, the pusher including a vertically settable feed clamp assembly which is controllable to a predetermined height (h) of the sheet substack, and a controller means for controlling the pressing force of the pusher against the sheet substack between at least a first force and a second force, the first force being less than the second force, a back gauge abutting a leading edge of the sheet stack and having an upper edge, the back gauge and the lift table being movable relative to each other in the vertical direction, wherein when the sheet substack is partially above the upper edge of the back gauge, the pusher presses the sheet substack with the first force and when the sheet substack is entirely above the upper edge of the back gauge, the pusher presses the sheet substack with the second force for transfer thereof from atop the sheet stack.

* * * * *